(12) United States Patent
Wang et al.

(10) Patent No.: US 11,418,388 B2
(45) Date of Patent: Aug. 16, 2022

(54) METHOD FOR NETWORK CONFIGURATION, AND ELECTRONIC DEVICE

(71) Applicant: BEIJING XIAOMI MOBILE SOFTWARE CO., LTD., Beijing (CN)

(72) Inventors: Qingyuan Wang, Beijing (CN); Zheng Li, Beijing (CN); Shaoze Ma, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 148 days.

(21) Appl. No.: 16/885,370

(22) Filed: May 28, 2020

(65) Prior Publication Data

US 2021/0152421 A1  May 20, 2021

(30) Foreign Application Priority Data

Nov. 15, 2019  (CN) .......................... 201911122610.8

(51) Int. Cl.
*H04L 41/0806* (2022.01)
*H04W 12/0431* (2021.01)
(Continued)

(52) U.S. Cl.
CPC ........ *H04L 41/0806* (2013.01); *H04L 9/0841* (2013.01); *H04L 9/3226* (2013.01);
(Continued)

(58) Field of Classification Search
CPC ............. H04L 12/2807; H04L 12/2803; H04L 41/0806; H04L 41/0803; H04L 63/061; H04W 88/08; H04W 8/005; H04W 84/12
See application file for complete search history.

(56) References Cited

U.S. PATENT DOCUMENTS

| 9,602,279 | B1* | 3/2017 | Tran ..................... H04L 9/0866 |
| 2012/0054493 | A1* | 3/2012 | Bradley ............... H04W 12/04 713/168 |

(Continued)

FOREIGN PATENT DOCUMENTS

| CN | 104469789 A | 3/2015 |
| CN | 105517103 A | 4/2016 |

(Continued)

OTHER PUBLICATIONS

Extended European Search Report dated Nov. 26, 2020 in corresponding European Patent Application No. 20181628.7, 9 pages.

*Primary Examiner* — Tae K Kim
(74) *Attorney, Agent, or Firm* — Oblon, McClelland, Maier & Neustadt, L.L.P.

(57) ABSTRACT

Aspect of the disclosure can provide a method for network configuration that can include broadcasting a probe request frame, the probe request frame carrying device information of a first device, and, responsive to that a predetermined field of a received probe response frame carries predetermined connection information, establishing a first connection, based on the predetermined connection information, with a target router that sent the probe response frame, the probe response frame carrying the predetermined connection information in the predetermined field being sent after the device information is verified. Additionally, the method can include acquiring a second network identifier from the target router based on the first connection, and establishing a second connection with the target router based on the second network identifier, to perform interaction with a second device through the second connection.

11 Claims, 15 Drawing Sheets

(51) Int. Cl.
  *H04L 9/08* (2006.01)
  *H04L 9/32* (2006.01)
  *H04L 9/40* (2022.01)
  *H04L 101/622* (2022.01)
(52) U.S. Cl.
  CPC ....... *H04L 63/083* (2013.01); *H04W 12/0431* (2021.01); *H04L 61/6022* (2013.01)

(56) References Cited

U.S. PATENT DOCUMENTS

| | | | | |
|---|---|---|---|---|
| 2016/0234678 A1* | 8/2016 | Baum | .................... | H04W 12/04 |
| 2017/0127467 A1 | 5/2017 | Fan et al. | | |
| 2017/0163626 A1* | 6/2017 | Meng | .................... | H04W 48/10 |
| 2017/0188397 A1* | 6/2017 | Liang | .................... | H04W 76/14 |
| 2017/0303320 A1* | 10/2017 | Meng | .................... | H04H 20/16 |
| 2017/0353859 A1 | 12/2017 | Idnani et al. | | |
| 2018/0359641 A1 | 12/2018 | Idnani et al. | | |
| 2019/0289468 A1 | 9/2019 | Idnani et al. | | |
| 2020/0120556 A1* | 4/2020 | Gargaro | ................ | H04W 36/26 |
| 2020/0178081 A1 | 6/2020 | Idnani et al. | | |

FOREIGN PATENT DOCUMENTS

| | | |
|---|---|---|
| CN | 106385695 A | 2/2017 |
| CN | 108449770 A | 8/2018 |
| CN | 109462850 A | 3/2019 |
| CN | 109714782 A | 5/2019 |
| CN | 109963352 A | 7/2019 |
| CN | 110167193 A | 8/2019 |
| EP | 3 163 803 A1 | 5/2017 |

* cited by examiner

METHOD FOR NETWORK CONFIGURATION, AND ELECTRONIC DEVICE

CROSS-REFERENCE TO RELATED APPLICATIONS

This application claims priority to Chinese Patent Application No. 201911122610.8, filed on Nov. 15, 2019, the disclosure of which is hereby incorporated by reference in its entirety.

TECHNICAL FIELD

The present disclosure generally relates to the technical field of the Internet of things, and more particularly, to a method and device for network configuration, an electronic device, and a storage medium.

BACKGROUND

The Internet of things is an important part of next-generation information technologies as well as an important development stage of the "information" age. As the name suggests, the Internet of things is an Internet for connecting things. This has two meanings: first, the core and basis of the Internet of things are still the Internet, and it is a network extended and expanded on the basis of the Internet; and second, the user terminals thereof extend or expand to any things to carry out information exchange and communication, namely the things are associated. The Internet of things is widely applied to network convergence through communication sensing technologies, such as intelligent sensing, a recognition technology, and pervasive computing. Accordingly, it is also called a third wave of development of the world information industry after computer and Internet.

Based on the development of Internet of things technologies, various Internet of things devices have appeared, and a Wireless Fidelity (Wi-Fi) module has become a standard configuration of an Internet of things device. For example, most of smart air conditioners and smart air purifiers are configured with Wi-Fi modules.

SUMMARY

The present disclosure provides a method for network configuration, and an electronic device. According to a first aspect of the present disclosure, a method for network configuration is provided that can be applied to a first device. The method can include broadcasting a probe request frame that carries device information of the first device, and responsive to that a predetermined field of a received probe response frame carries predetermined connection information, a first connection is established, based on the predetermined connection information, with a target router that sent the probe response frame, the probe response frame carrying the predetermined connection information in the predetermined field being sent after the device information is verified. Additionally, the method can acquire a second network identifier from the target router based on the first connection, and a second connection with the target router is established based on the second network identifier, to perform interaction with a second device through the second connection.

According to a second aspect of the present disclosure, a method for network configuration is provided that can be applied to a router. The method can include receiving a probe request frame broadcast by a first device, the probe request frame carrying device information of the first device, and parsing the probe request frame to obtain the device information, and the obtained device information is sent to a server. The method can further include, responsive to receiving verification success information sent by the server based on the device information, a probe response frame carrying predetermined connection information in a predetermined field is sent to the first device, a first connection is established with the first device based on the predetermined connection information, a second network identifier is sent to the first device based on the first connection, and a second connection with the first device is established based on the second network identifier, to implement transmission of interaction information between the first device and a second device.

According to a third aspect of the embodiments of the present disclosure an electronic device. The electronic device can include a processor and a memory that is configured to store instructions executable by the processor. The processor can be configured to execute the instructions stored in the memory to broadcast a probe request frame, the probe request frame carrying device information of the first device, and, responsive to that a predetermined field of a received probe response frame carries predetermined connection information, establish, based on the predetermined connection information, a first connection with a target router that sent the probe response frame, the probe response frame carrying the predetermined connection information in the predetermined field being sent after the device information is verified. The processor can further configured to acquire a second network identifier from the target router based on the first connection, and establish a second connection with the target router based on the second network identifier, to perform interaction with a second device through the second connection.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this disclosure, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

Figure 1:
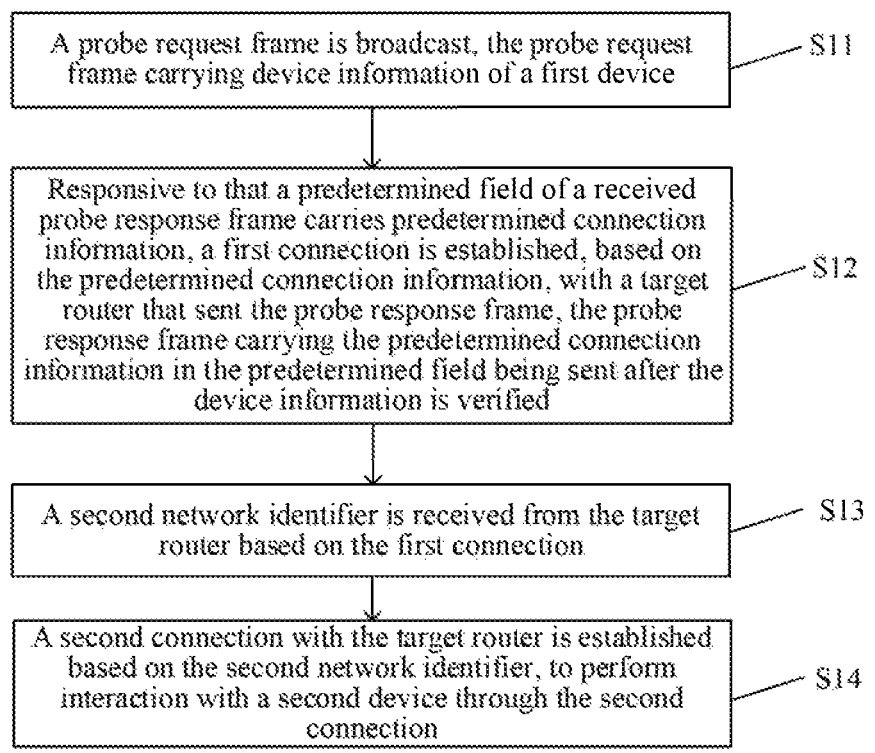
FIG. 1 is a first flowchart of a method for network configuration according to an embodiment of the present disclosure.

FIG. 1 is a first flowchart of a method for network configuration according to an embodiment of the present disclosure. The method for network configuration is applied to a first device. As illustrated in FIG. 1, the method for network configuration includes the following operations.

In S11, a probe request frame is broadcast, where the probe request frame carries device information of the first device.

In S12, responsive to that a predetermined field of a received probe response frame carries predetermined connection information, a first connection is established with a target router that sent the probe response frame; here, the probe response frame carrying the predetermined connection information in the predetermined field is sent after the device information is verified.

In S13, a second network identifier is received from the target router based on the first connection.

In S14, a second connection with the target router is established based on the second network identifier, to perform interaction with a second device through the second connection.

In the embodiment of the present disclosure, the first device refers to an Internet of things device required to perform information interaction with another device, and includes an intelligent home device that may move automatically or may not move automatically, for example, a robotic vacuum cleaner, a smart speaker or a smart television.

For example, the Internet of things device includes a Wi-Fi module, and the Internet of things device performs information interaction with another device based on the Wi-Fi module. For example, the intelligent speaker performs, based on a built-in Wi-Fi module, information interaction with a mobile phone that manages intelligent home devices; or, the intelligent speaker performs information interaction with the intelligent television based on the built-in Wi-Fi module.

In the embodiment of the present disclosure, the network identifier includes a Service Set identifier (SSID). The SSID is used for distinguishing different networks. The SSID may be the name of a local area network. Devices set with the same SSID value may communicate with one another within the local area network.

In some embodiments, routers and devices of the same manufacturer or brand may pre-store the same SSID, so there may be many routers with the same SSID and it is very likely that multiple routers with the same SSID provide service. For example, a neighbor also has a router with the same SSID, and the first device may be connected to the router of the neighbor.

Therefore, according to the embodiment of the present disclosure, the predetermined connection information is carried in the predetermined field of the protocol frame to determine the target router for network configuration of the first device in advance to reduce the probability that the first device is connected to the router of the neighbor.

In S11, the first device is in a Station (STA) mode, and in the STA mode, the first device may broadcast the probe request frame, the probe request frame carrying the device information of the first device. For example, the first device enters the STA mode after being turned on, or, the first device enters the STA mode after exiting an airplane mode, or, the first device enters the STA mode after exiting a sleep mode and entering an activated mode.

Exemplarily, the first device communicates with the router based on a protocol specified by the general wireless local area network standard IEEE 802.11. IEEE 802.11 includes management frames, control frames and data frames. The management frame includes two parts, i.e., a MAC header and a frame body. The management frames mainly serve for scanning, authentication and connection. The frames for scanning in the management frames include a probe_request frame and a probe_response frame.

Figure 2:
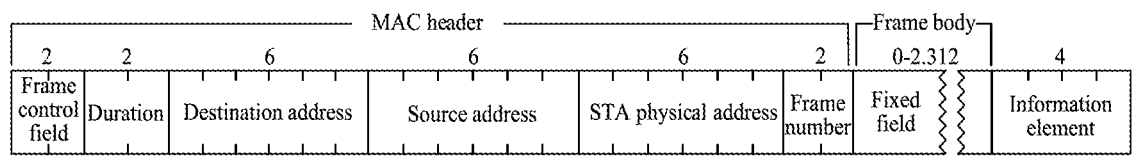
FIG. 2 is a structure diagram of a management frame.
Figure 3:
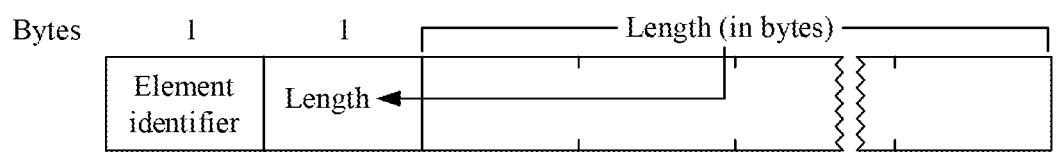
FIG. 3 is a structure diagram of an information element of a management frame.

FIG. 2 is a structure diagram of a management frame. As illustrated in FIG. 2, the MAC header includes a frame control field, a duration/identity field, a source address field, a destination address field, a frame number and the like. The frame body includes two types of data: a fixed field and an information element. The fixed field refers to a fixed-length field, and the fixed field carries related information of a time stamp, a connection state of a wireless connection and the like. The information element is a variable-length component of the management frame. FIG. 3 is a structure diagram of an information element of a management frame. As illustrated in FIG. 3, the information element includes an element identifier field, a length field and a variable-length field. The element identifier field includes basic parameters such as a channel identifier, a transmission rate and a transmission bandwidth, and the length field includes a number of bytes occupied by data carried in the management frame. The variable-length field is a custom field, and the custom field is usually null.

In the embodiment of the present disclosure, the probe request frame broadcast by the first device may be the probe_request frame, and a custom field in an information element of the probe request frame is not null but carries the device information of the first device. The device information at least includes a Device Identifier (DID) of the first device, and may further include at least one of a device type or a device name, etc. Exemplarily, in the embodiment of the present disclosure, the information carried in the probe request frame is illustrated in Table 1.

TABLE 1

First Probe Request Frame

| Information carried in the element identifier field | Information carried in the length field | Information carried in the custom field |
|---|---|---|
| Channel identifier | A number of bytes | DID |

The first device, after broadcasting the probe request frame, may receive probe response frames, for example, probe_response frames, sent by different routers. A data structure of the probe_response frame is the same as a data structure of the probe_request frame, and an information element of the probe_response frame also includes a custom field that may carry some custom predetermined connection information and may also be null.

In the present disclosure, in S12, the first device may determine whether the predetermined field of the received probe response frame carries the predetermined connection information or not, the predetermined field being a custom field. The probe response frame carrying the predetermined connection information in the predetermined field is sent after the device information is verified.

In an embodiment, the probe request frame further carries a first network identifier pre-stored in the first device, and the predetermined connection information is a MAC address of the target router.

In the embodiment, the information carried in the probe request frame is illustrated in Table 2.

TABLE 2

Second Probe Request Frame

| Information carried in the element identifier field | Information carried in the length field | Information carried in the custom field |
|---|---|---|
| Channel identifier | A number of bytes | DID and SSID |

In the embodiment, the first network identifier may be a first SSID. The pre-stored first network identifier is not only stored in the first device but also stored in the router, and the probe request frame carries the pre-stored first network identifier, so that the probe request frame broadcast by the first device may only be received by the router with the same pre-stored first network identifier. The probe response frame received by the first device is also sent by the router with the same first network identifier.

In the embodiment of the present disclosure, with respect to the first network identifier and the second network identifier, the second network identifier is a network identifier recognizable for a router wide area network device such as a server, and the first network identifier may be a network identifier recognizable in the local area network constructed by the router.

In some embodiments, the first network identifier may be information burnt in the first device and the router in advance before the first device and the router are delivered. The first network identifier pre-stored in the router used for forwarding information may be hidden and may also not be hidden. Further, the first network identifier may also be written into the first device and/or the router in an upgrading process of software and/or firmware after the first device and the router are delivered.

The first device receives probe response frames sent by different routers with the same first network identifier. Each router may verify the device information, and when a verification result of a router is that the device information is verified, the router is considered to be the target router in the embodiment of the present application. The router may send the probe response frame, and the probe response frame may carry the predetermined connection information. The predetermined connection information includes the MAC address of the target router, i.e., a MAC address of an STA that the target router belongs to, also called a special Basic Service Set Identifier (BSSID) used to uniquely identify the target router.

The device information is verified in a manner that the router uploads the device information to the server managing the router and then the server sends the device information to a user side for the user to confirm whether the device information is information of an own device or not.

For example, the first device is an intelligent speaker. The intelligent speaker carries a device type (Model) and a DID in a probe request frame and broadcasts the probe request frame to the router. The router uploads device information including the device type and the DID to the server managing the router, and the device information may be displayed in an Application (APP) used for managing the intelligent device in a mobile phone of the user. The user, when determining based on the device type and the DID that the first device is the own intelligent speaker that network configuration has yet not been performed on, sends verification success information indicating that the device information is verified to the router through the server based on an operation in the APP.

In the embodiment, after the device information is verified, the target router carries the MAC address of the target router in the predetermined field of the probe response frame fed back to the first device. Information carried in the probe response frame is illustrated in Table 3.

TABLE 3

First Probe Response Frame

| Information carried in the element identifier field | Information carried in the length field | Information carried in the custom field |
|---|---|---|
| Channel identifier | A number of bytes | BSSID |

In Table 3, the BSSID carried in the custom field is one type of predetermined connection information. The first device, after obtaining the BSSID of the target router by parsing the received probe response frame, may establish the first connection with the target router based on the BSSID in S12.

For example, the first device sends a connection request carrying the MAC address of the target router based on the pre-stored first network identifier. The connection request specifies the MAC address of the target router and thus may only be sent to the target router. Based on this, the first device may establish the first connection with the target router only. The first device may obtain network configuration information of the target router based on the established first connection, the network configuration information at least including the second network identifier. The first device, after obtaining the network configuration information, may perform information interaction with another device through the target router.

It can be understood that, in the embodiment, the device information of the first device is carried in the probe request frame, the probe response frame fed back by the target router and carrying the BSSID of the target router in the predetermined field is received, and in such a manner, under the condition that the neighbor also has a router with the same first network identifier, the first device, when initiating the first connection, may be connected with the own router based on BSSID information rather than connected to the router of the neighbor, so that network configuration accuracy may be improved.

In an embodiment, the probe request frame only carries the device information, as illustrated in Table 1, and the predetermined connection information carried in the predetermined field of the probe response frame includes the first network identifier and first password used to access the target router.

The probe request frame only carries the device information and may not include the SSID information, so that both routers with the same SSID and routers with different SSIDs may receive the probe request frame broadcast by the first device. However, in probe response frames received by the first device from the routers with the same SSID or different SSIDs, only the probe response frame fed back by the target router may carry the predetermined connection information, the predetermined connection information including the first network identifier and first password used to access the target router. In the embodiment, the target router also refers to a router receiving the verification success information indicating that the device information is verified.

In the embodiment, the first network identifier may not be pre-stored in the first device but customized by the manufacturer before the router is delivered, and the first network identifier is matched with the first password. For example, the first network identifier and the first password are randomly generated. It can be understood that the randomly generated first network identifier and first password may be used to uniquely identify the target router.

In an embodiment, the predetermined connection information includes encrypted information obtained by the target router by encrypting the first network identifier and the first password.

In addition, for improving security of the information used to uniquely identify the target router in the probe response frame, in the embodiment, the probe response frame carries the encrypted information obtained by encrypting the first network identifier and the first password. The information carried in the probe response frame is illustrated in Table 4.

TABLE 4

Second Probe Response Frame

| Information carried in the element identifier field | Information carried in the length field | Information carried in the custom field |
|---|---|---|
| Channel identifier | A number of bytes | Encrypted information |

In Table 4, the encrypted information carried in the custom field and obtained by encrypting the first network identifier and the first password is also a type of predetermined connection information.

In an embodiment, when the predetermined connection information includes the encrypted information obtained by the target router by encrypting the first network identifier and the first password, the method further includes that the encrypted information is decrypted with a pre-stored decryption key to obtain the first network identifier and the first password.

In the embodiment, the first network identifier and the first password are not pre-stored in the first device, but the first device pre-stores the decryption key. The decryption key may be information burnt in the first device in advance before the first device is delivered.

The first device, after obtaining the first network identifier and first password of the target router by decrypting the received probe response frame, may establish the first connection with the target router based on the first network identifier and the first password in S12. The network configuration information of the target router may be obtained based on the established first connection, the network configuration information at least including the second network identifier. The first device, after obtaining the network configuration information, may perform information interaction with another device through the target router.

It can be understood that, in the embodiment, the first device carries the device information of the first device in the probe request frame and receives the probe response frame fed back by the target router, the predetermined field of the probe response frame carrying the encrypted information obtained by encrypting the first network identifier and first password of the target router, and in such a manner, under the condition that the neighbor also has a router with the same first network identifier, the first device, when initiating the first connection, may access the own router based on the first network identifier and first password received from the target router rather than access the router of the neighbor, so that the network configuration accuracy may be improved. In addition, compared with the manner of carrying the BSSID of the target router in the predetermined field, this manner has the advantage that the Wi-Fi module is not required to provide a Wi-Fi connecting interface for carrying the BSSID, so that universal applicability of the network configuration manner may be improved.

In a software-routing-based network configuration method, intelligent hardware is in a wireless Access Point (AP) mode after power-on, and a mobile phone is in an STA mode, so the mobile phone is connected with an AP of the intelligent hardware to form a local area network. The mobile phone establishes socket-interface-based communication with the intelligent hardware and sends an SSID and password of a router to be connected to the intelligent hardware, and the intelligent hardware, after receiving the SSID and the password, is switched to the STA mode and is connected to the router based on the received SSID.

In the software-routing-based network configuration method, the intelligent hardware is the first device in the present disclosure, the mobile phone is required to search for the AP of the intelligent hardware at first, router network configuration information (the SSID and the password) acquired by the intelligent hardware is manually input into the mobile phone by a user of the mobile phone and sent through the mobile phone, and the mobile phone, after sending the network configuration information to the intelligent hardware, is further required to be manually switched back to the AP of the router. It can be understood that network configuration intelligence is relatively low in this process. In the present disclosure, the first device carries the device information of the first device in the probe request frame, determines the target router based on the predetermined connection information carried in the received probe response frame, and only establishes the first connection with the target router to automatically obtain the second network identifier for network configuration through the first connection to implement forwarding of interaction information between the first device and the second device through the router. In this process, manual operations of the user are avoided, and the connection is established with the target router only, so that the network configuration intelligence and the network configuration accuracy are improved.

In a one-key configuration-based network configuration method, an intelligent device is in a monitoring mode when being turned on and may capture a broadcast packet over the air. A mobile phone is connected with a Wi-Fi router, an APP of the mobile phone sends a User Datagram Protocol (UDP) broadcast packet carrying an encrypted SSID and password of the router. A Wi-Fi module of the intelligent device, after receiving the encrypted broadcast packet sent by the mobile phone, performs decryption to obtain the SSID that may be connected and the password, switches a connection mode from the monitoring mode to an STA mode, is actively connected to the router, is connected to a cloud and reports device state information.

In the one-key configuration-based network configuration method, the intelligent device is the first device in the present disclosure. Since the intelligent device is in the monitoring mode when being turned on and monitors all information, a processor of the intelligent device is highly loaded, and a success rate of network configuration may not be ensured. In addition, since network configuration information is sent by the APP of the mobile phone in a broadcast manner and is easily intercepted, the security is low. In the present disclosure, the second network identifier for network configuration is sent by the target router based on the established first connection with the target router, and is not required to be obtained by the first device by receiving the broadcast from the cloud, so that the security may be improved.

In an embodiment, the network configuration method for the first device further includes that key negotiation is performed with the target router based on the first connection to obtain a first key and a second key used with the first key in pair.

The operation that the first device acquires the second network identifier from the target router based on the first connection includes that the second network identifier and second password encrypted according to the first key are received from the target router based on the first connection.

The method further includes that the encrypted second network identifier and second password are decrypted with the first key or the second key.

In the embodiment, the router not only sends the second network identifier to the first device but also sends the second password matched with the second network identifier, and the first device, after establishing the connection with the target router based on the predetermined connection information, may further perform key negotiation with the target router and receive encrypted information obtained by the target router by encrypting the second network identifier and the second password, to further improve the security. When the first device performs key negotiation with the target router, a symmetric encryption manner may be adopted, and in such case, an encryption key and the decryption key are the same and both are the first key; and an asymmetric encryption manner may also be adopted, and in such case, the encryption key and the decryption key are different, the first key is the encryption key and the second key is the decryption key. An encryption manner is not specifically limited in the embodiment of the present disclosure.

Compared with the one-key configuration-based network configuration method in which the encryption key and the decryption key are pre-stored keys, the present disclosure has the advantage that the target router negotiates with the first device to generate the encryption key and decryption key that are different, so that the security may further be improved.

It can be understood that, in the embodiment of the present disclosure, the first device carries the device information of the first device in the probe request frame and determines the target router based on the predetermined connection information carried in the received probe response frame, the probe response frame carrying the predetermined connection information is sent after the device information is verified by the router, and a router that the first device is not required to be assessed may not transmit the probe response frame, so that the target router required to be assessed may be selected from multiple routers for network configuration of the first device. In this process, manual operations of the user are avoided, so that network configuration intelligence is improved. In addition, the second network identifier for network configuration is received from the target router based on the first connection rather than obtained by the first device by receiving the broadcast from a cloud, so that security in a network configuration process may be improved.

Figure 4:
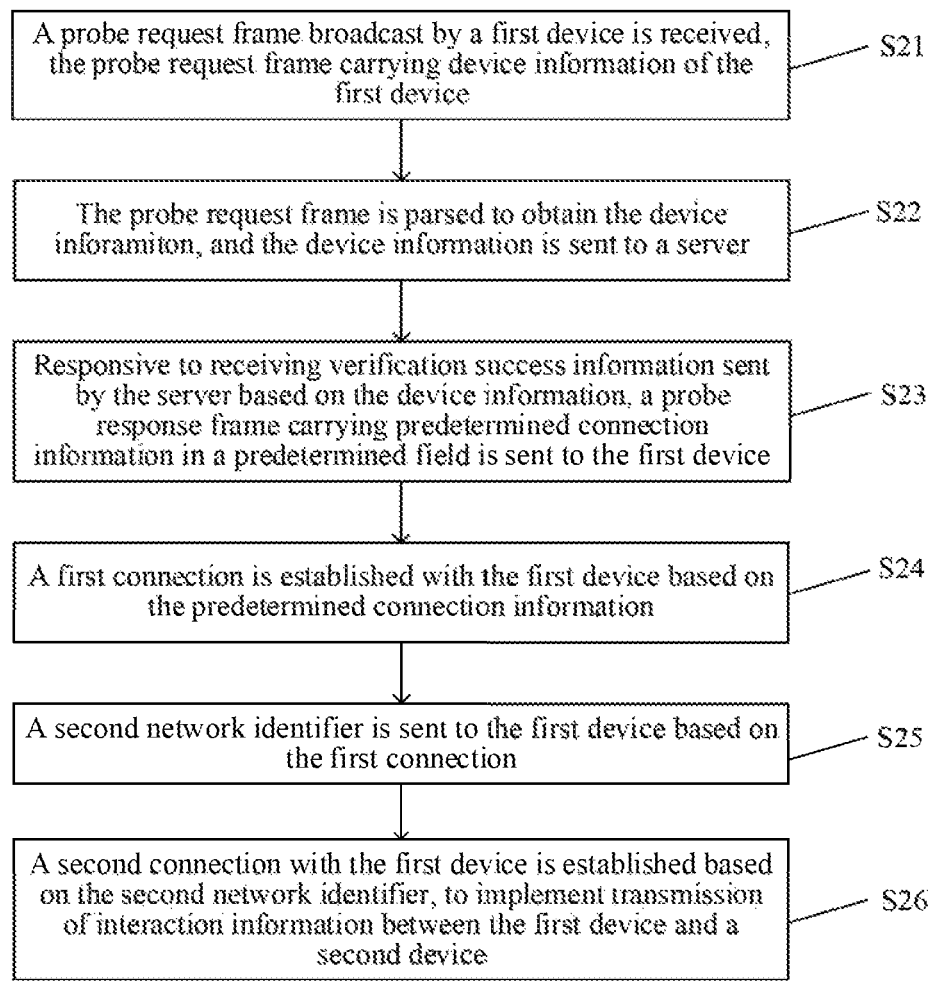
FIG. 4 is a second flowchart of a method for network configuration according to an embodiment of the present disclosure.

FIG. 4 is a second flowchart of a method for network configuration according to an embodiment of the present disclosure. The method for network configuration is applied to a router. As illustrated in FIG. 4, the method for network configuration includes the following operations.

In S21, a probe request frame broadcast by a first device is received, the probe request frame carrying device information of the first device.

In S22, the probe request frame is parsed to obtain the device information, and the device information is sent to a server.

In S23, responsive to receiving verification success information sent by the server based on the device information, a probe response frame carrying predetermined connection information in a predetermined field is sent to the first device.

In S24, a first connection is established with the first device based on the predetermined connection information.

In S25, a second network identifier is sent to the first device based on the first connection.

In S26, a second connection with the first device is established based on the second network identifier to implement transmission of interaction information between the first device and a second device.

The router is a hardware device that connects two or more networks, acts as a gateway between the networks, and forwards information between different devices.

It is to be noted that the first network identifier pre-stored in the router may be hidden, namely not broadcast externally, and thus another device that does not pre-store the first network identifier, other than the first device, may not search for the first network identifier and access a network based on the first network identifier, that is, the first network identifier is invisible to the device that does not pre-store the first network identifier. Of course, the first network identifier may also not be hidden, and another device, besides the first device, may access the network through the first network identifier. However, it is to be emphasized that the first network identifier in the embodiment of the present disclosure is mainly for making it convenient for the router to provide information required by network configuration for the first device.

In the embodiment of the present disclosure, the router may receive the probe request frame broadcast by the first device and parse the probe request frame to obtain the device information carried in the probe request frame. The router, after obtaining the device information, uploads the device information to the server. The server then sends the received device information to a mobile phone for a user to determine whether the device information belongs to an own device or not based on an APP of the mobile phone. The router, after receiving the verification success information, may send the probe response frame carrying the predetermined connection information in the predetermined field to the first device to tell the first device that it is a target router of the first device.

In an embodiment, the probe request frame further carries a first network identifier pre-stored in the first device, and the predetermined connection information includes a MAC address of the router. Exemplarily, the probe response frame sent by the router is illustrated in Table 3.

In the embodiment, the first device also pre-stores the first network identifier.

In another embodiment, the predetermined connection information includes the first network identifier and first password used to access the target router. Of course, the predetermined connection information may also include encrypted information obtained by the target router by encrypting the first network identifier and the first password. Exemplarily, the probe response frame sent by the router is illustrated in Table 4.

In the embodiment, the first device may not pre-store the first network identifier and the first password. In an embodiment, when the predetermined connection information further includes the encrypted information obtained by the target router by encrypting the first network identifier and the first password, the operation illustrated in S24 includes that the first connection with the first device is established by use of decrypted first network identifier and first password, the decrypted first network identifier and first password being obtained by the first device by decrypting the encrypted information with a pre-stored decryption key.

It can be understood that, in the embodiment of the present disclosure, the router carries its own BSSID or the encrypted information obtained by encrypting its own first network identifier and first password in the predetermined field of the fed back probe response frame, and in such a manner, under the condition that a neighbor also has a router with the same network identifier, the first device, when initiating the first connection, may access the own router based on the BSSID or the first network identifier and the first password rather than access the router of the neighbor, so that the network configuration accuracy may be improved.

In an embodiment, the network configuration method for the router further includes that key negotiation is performed with the first device based on the first connection to obtain a first key and a second key used with the first key in pair.

The operation that the second network identifier is sent to the first device based on the first connection includes that the second network identifier and second password encrypted with the first key are sent to the first device based on the first connection.

The operation that the second connection with the first device is established based on the second network identifier includes that the second connection with the first device is established based on the decrypted second network identifier and second password. Here, the decrypted second network identifier and second password are obtained by the first device by decrypting the encrypted second network identifier and second password with the first key or the second key.

In the embodiment, the router not only sends the second network identifier to the first device but also sends the second password matched with the second network identifier, and the router, after establishing the connection with the first device based on the predetermined connection information, may further perform key negotiation with the first device and encrypt the second network identifier and second password to be sent, to further improve the security.

It can be understood that, in the embodiment of the present disclosure, the router receives the probe request frame carrying the device information of the first device and carries the predetermined connection information in the probe response frame to indicate that it is the target router, to enable the first device to establish the first connection only with the target router based on the predetermined connection information and receive the second network identifier sent by the target router, so that the network configuration accuracy is improved. In addition, the target router automatically sends the second network identifier to the first network device based on the established first connection for network configuration and forwards the interaction information between the first device and the second device. In this process, manual operations of the user are avoided, so that network configuration intelligence is improved. Moreover, the second network identifier for network configuration is directly sent to the first device by the router based on the first connection, and is not required to be obtained by receiving the broadcast from a cloud, so that the security in the network configuration process may be improved.

Figure 5:
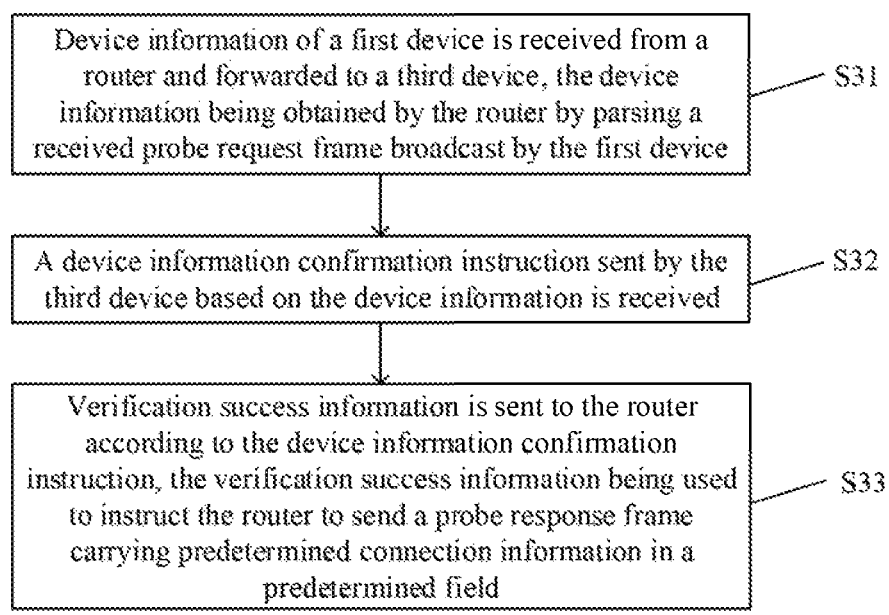
FIG. 5 is a third flowchart of a method for network configuration according to an embodiment of the present disclosure.

FIG. 5 is a third flowchart of a method for a network configuration according to an embodiment of the present disclosure. The method for network configuration is applied to a server. As illustrated in FIG. 5, the method for network configuration includes the following operations.

In S31, device information of a first device is received from a router and forwarded to a third device, the device information being obtained by the router by parsing a received probe request frame broadcast by the first device.

In S32, a device information confirmation instruction sent by the third device based on the device information is received.

In S33, verification success information is sent to the router according to the device information confirmation instruction; here, the verification success information is used to instruct the router to send a probe response frame carrying predetermined connection information in a predetermined field.

In the embodiment, the server participates in a network configuration process, the third device includes a mobile phone, and the server, after receiving the device information sent by the router, sends the device information to the mobile phone for a user to determine whether the first device is an own device requiring network configuration or not based on an APP of the mobile phone. The server, after receiving the verification success information sent by the APP of the mobile phone, may send the verification success information to the router to instruct the router to send a probe response frame carrying predetermined connection information in a predetermined field.

Figure 6:
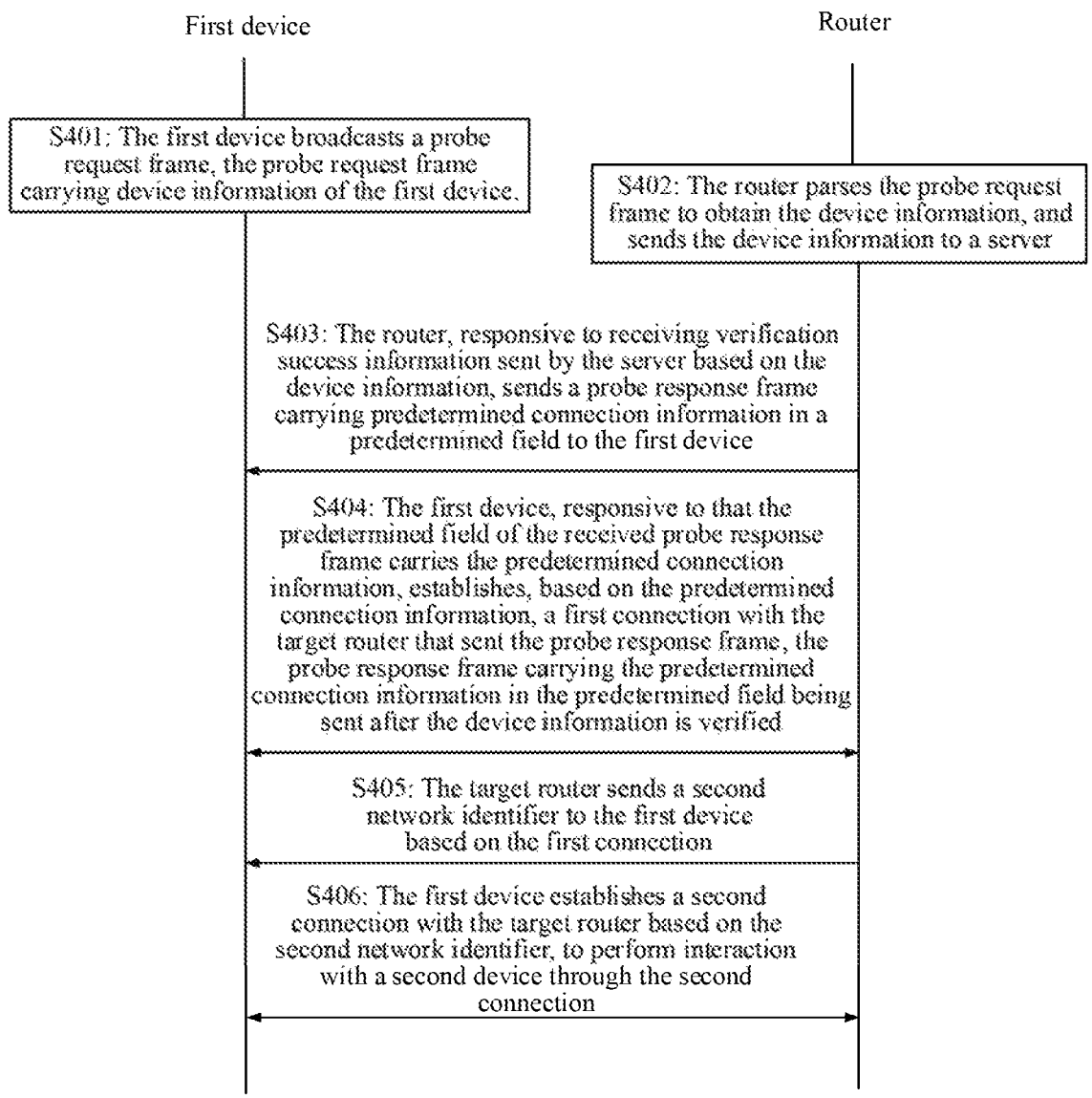
FIG. 6 is a first interaction flowchart of a method for network configuration according to an embodiment of the present disclosure.

FIG. 6 is a first interaction flowchart of a method for network configuration according to an embodiment of the present disclosure. As illustrated in FIG. 6, the network configuration method applied to a first device and a router includes the following operations.

In S401, the first device broadcasts a probe request frame, the probe request frame carrying device information of the first device.

In S402, the router parses the probe request frame to obtain the device information, and sends the obtained device information to a server.

In S403, the router, responsive to receiving verification success information sent by the server based on the device information, sends a probe response frame carrying predetermined connection information in a predetermined field to the first device.

In S404, the first device, responsive to that the predetermined field of the received probe response frame carries the predetermined connection information, establishes, based on the predetermined connection information, a first connection with the target router that sent the probe response frame. Here, the probe response frame carrying the predetermined connection information in the predetermined field is sent after the device information is verified.

In S405, the target router sends a second network identifier to the first device based on the first connection.

In S406, the first device establishes a second connection with the target router based on the second network identifier, to perform interaction with a second device through the second connection.

It can be understood that, in the embodiment of the present disclosure, the first device carries the device information of the first device in the broadcast probe request frame, and the router carries the predetermined connection information in the probe response frame to identify that it is the target router to enable the first device to establish the first connection with the target router based on the predetermined connection information to acquire the second network identifier from the target router. Since the target router is determined before the first connection is established, the network configuration accuracy is improved. In addition, the target router sends the second network identifier to the first network based on the established first connection for network configuration and forwards interaction information between the first device and the second device. In this process, manual operations of a user are avoided, and the first device establishes the connection with the target router only, so that the network configuration intelligence is improved. Moreover, the second network identifier for network configuration is directly sent to the first device by the router based on the first connection, and is not required to be obtained by the first device by receiving the broadcast from a cloud, so that security in a network configuration process may be improved.

Figure 7:
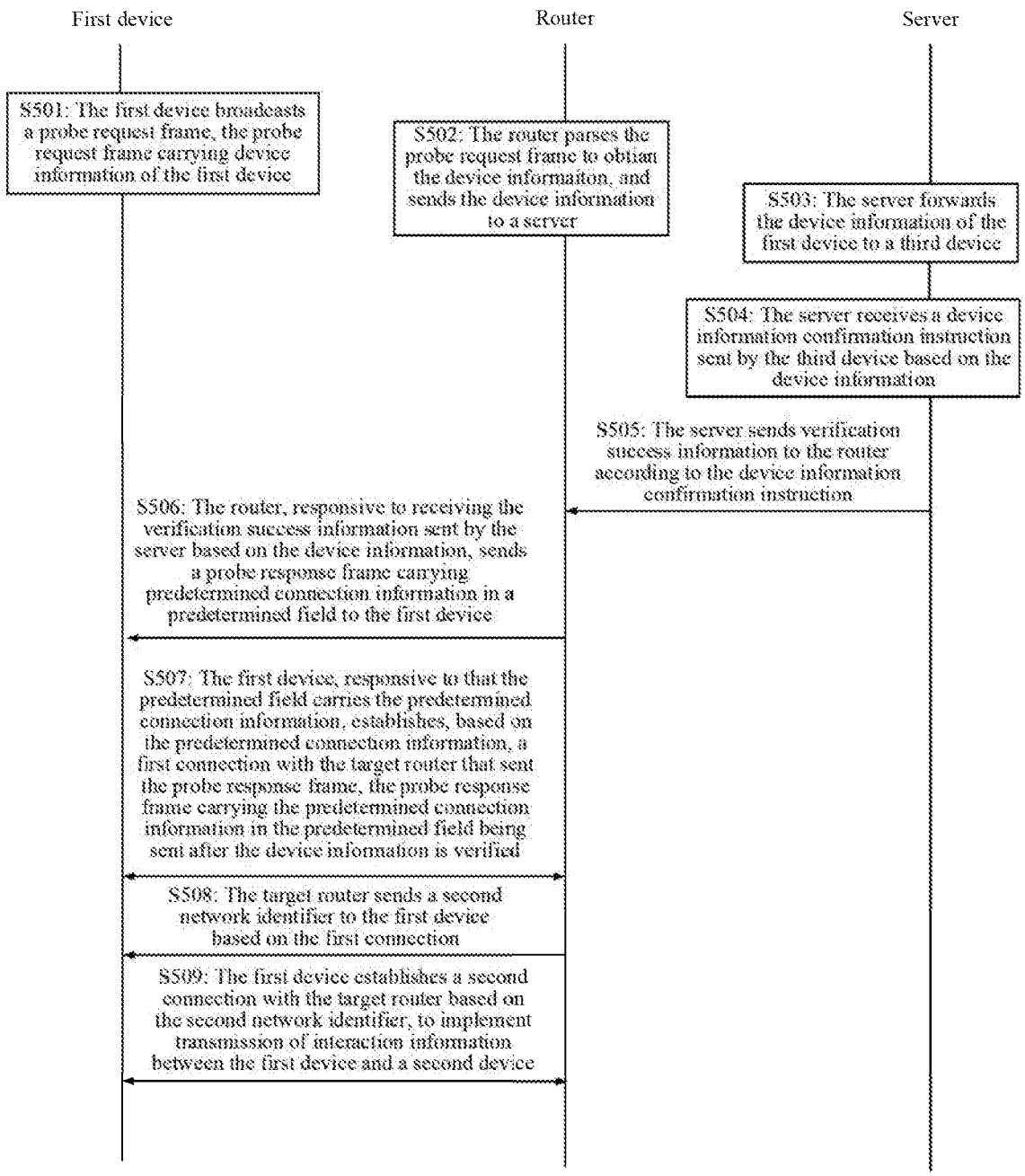
FIG. 7 is a second interaction flowchart of a method for network configuration according to an embodiment of the present disclosure.

FIG. 7 is a second interaction flowchart of a method for network configuration according to an embodiment of the present disclosure. As illustrated in FIG. 7, the network configuration method applied to a first device, a router and a server includes the following operations.

In S501, the first device broadcasts a probe request frame, the probe request frame carrying device information of the first device.

In S502, the router parses the probe request frame to obtain the device information, and sends the obtained device information to a server.

In S503, the server forwards the device information of the first device to a third device.

In S504, the server receives a device information confirmation instruction sent by the third device based on the device information.

In S505, the server sends verification success information to the router according to the device information confirmation instruction.

In S506, the router, responsive to receiving the verification success information sent by the server based on the device information, sends a probe response frame carrying predetermined connection information in a predetermined field to the first device.

In S507, the first device, responsive to that the predetermined field of the probe response frame carries the predetermined connection information, establishes, based on the predetermined connection information, a first connection with the target router that sent the probe response frame; here, the probe response frame carrying the predetermined connection information in the predetermined field is sent after the device information is verified.

In S508, the target router sends a second network identifier to the first device based on the first connection.

In S509, the first device establishes a second connection with the target router based on the second network identifier, to implement transmission of interaction information between the first device and a second device.

It can be understood that, in the embodiment of the present disclosure, the first device carries the device information of the first device in the broadcast probe request frame, and the router carries the predetermined connection information in the probe response frame to identify that it is the target router to enable the first device to establish the first connection only with the target router based on the predetermined connection information. The target router sends the second network identifier to the first network based on the established first connection for network configuration and forwards the interaction information between the first device and the second device. In this process, the target router is determined before the first connection is established, so that the network configuration accuracy may be improved. In addition, manual operations of a user are avoided, so that the network configuration intelligence is improved. Moreover, the second network identifier for network configuration is directly sent to the first device by the router based on the first connection, and is not required to be obtained by the first device by receiving the broadcast from a cloud, so that security in a network configuration process may be improved.

Figure 8:
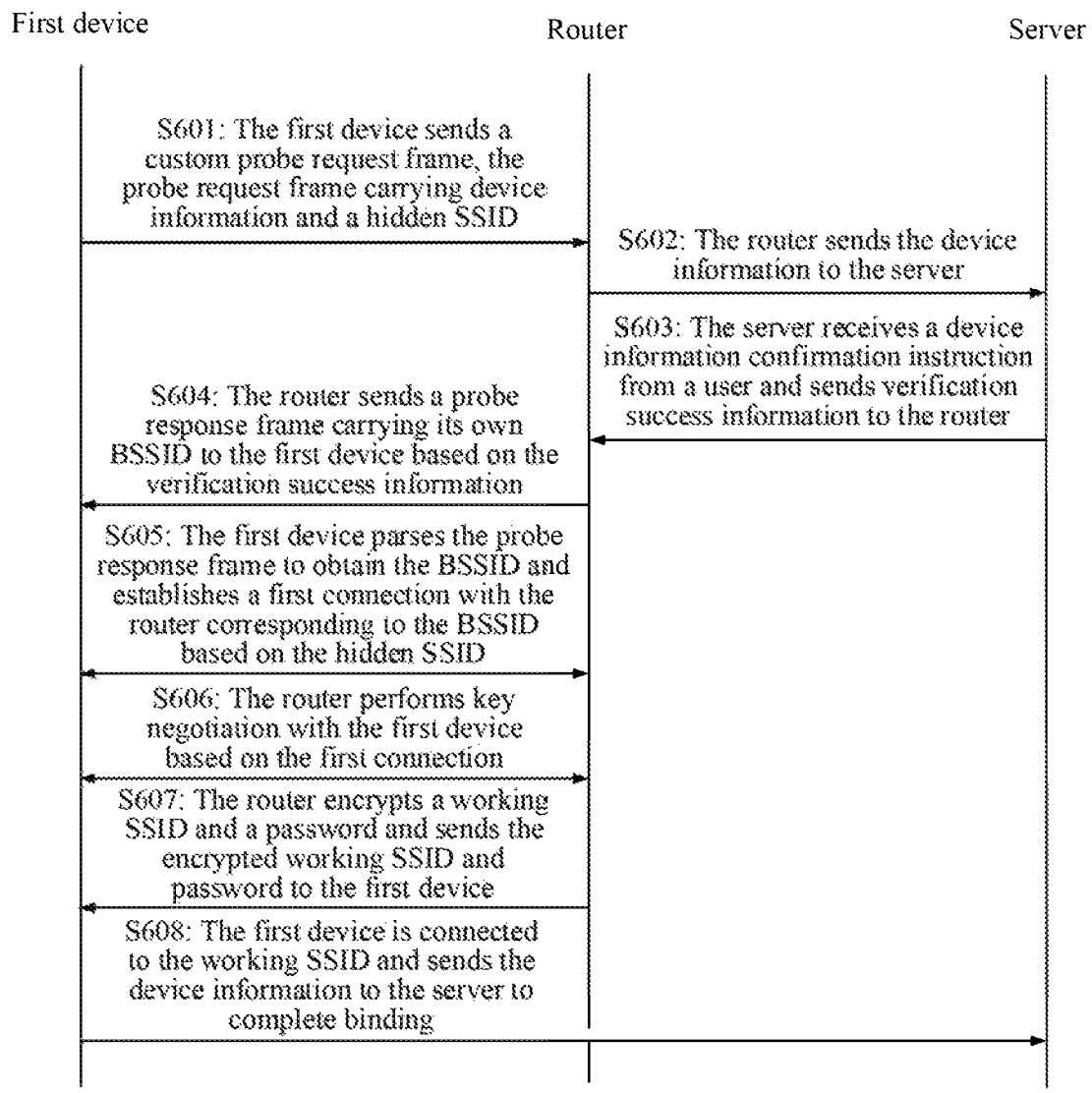
FIG. 8 is a first interaction flowchart of a method for network configuration according to an embodiment of the present disclosure.

FIG. 8 is a first interaction flowchart of a method for network configuration according to an embodiment of the present disclosure. As illustrated in FIG. 8, the network configuration method applied to a first device, a router and a server includes the following operations.

In S601, the first device sends a custom probe request frame, the probe request frame carrying device information and a hidden SSID.

In the embodiment, the first device is in an STA mode after power-on and may broadcast the probe request frame, the hidden SSID in the probe request frame being a first network identifier.

In S602, the router sends the device information to the server.

In S603, the server receives a device information confirmation instruction from a user and sends verification success information to the router.

In S604, the router sends a probe response frame carrying its own BSSID to the first device based on the verification success information.

In S605, the first device parses the probe response frame to obtain the BSSID and establishes a first connection with the router corresponding to the BSSID based on the hidden SSID.

In S606, the router performs key negotiation with the first device based on the first connection.

In S607, the router encrypts a working SSID and a password and sends the encrypted working SSID and password to the first device.

In the embodiment, the working SSID is a second network identifier, and the password is a second password matched with the second network identifier.

In S608, the first device is connected to the working SSID and sends the device information to the server to complete binding.

The first device is connected to the working SSID and sends the device information to the server to implement information interaction through the router.

It can be understood that, in the embodiment of the present disclosure, the first device carries the device information of the first device in the broadcast probe request frame, the router carries predetermined connection information in the probe response frame to identify that it is a target router, the probe response frame carrying the predetermined connection information is sent after the device information is verified by the router, and a router that the first device is not required to be connected to may not transmit the probe response frame, so that the target router required to be connected may be selected from multiple routers for network configuration of the first device. In this process, manual operations of the user are avoided, so that network configuration intelligence is improved. Moreover, the second network identifier for network configuration is directly sent to the first device by the router based on the first connection, and is not required to be obtained by receiving the broadcast from a cloud, so that the security in the network configuration process may be improved.

Figure 9:
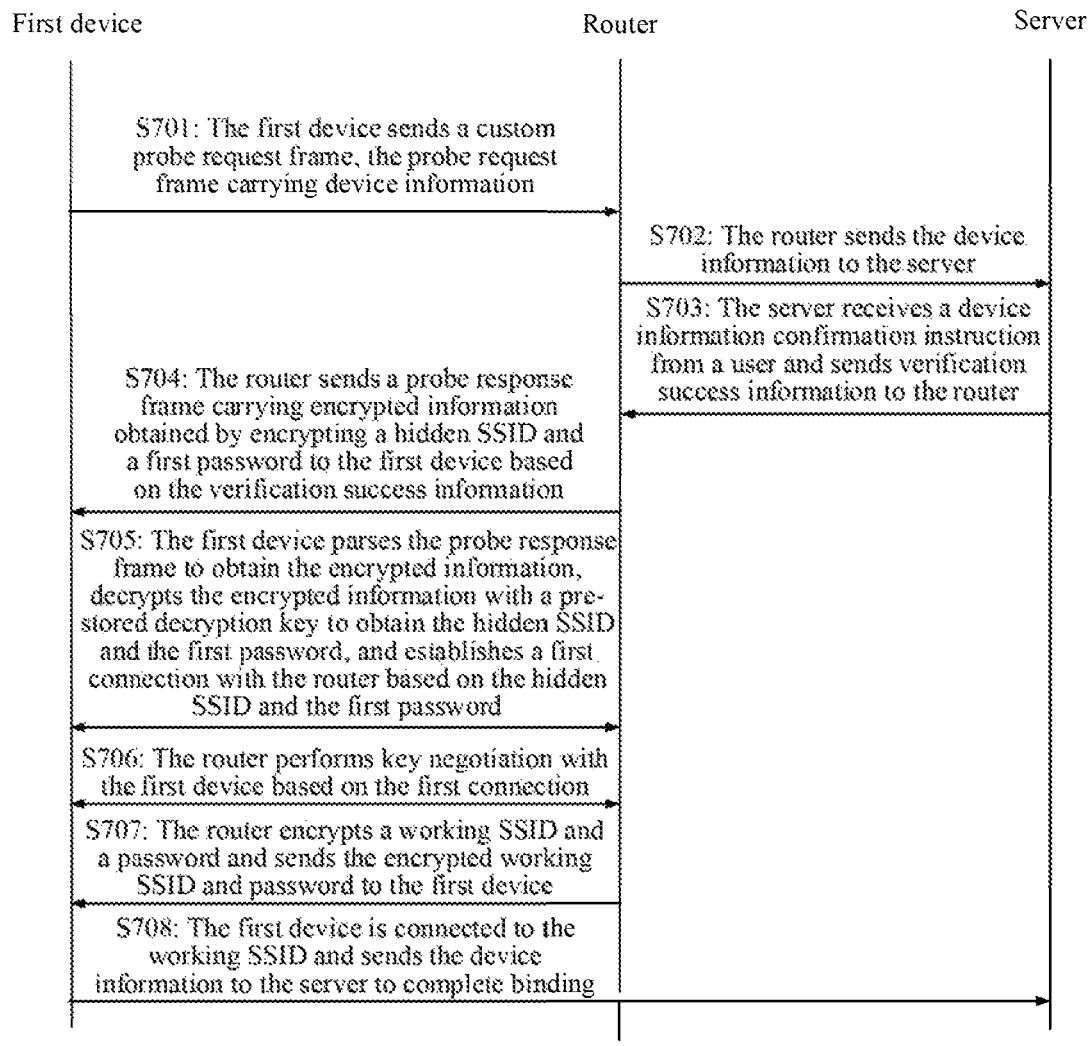
FIG. 9 is a second interaction flowchart of a method for network configuration according to an embodiment of the present disclosure.

FIG. 9 is a second interaction flowchart of a method for network configuration according to an embodiment of the present disclosure. As illustrated in FIG. 9, the network configuration method applied to a first device, a router and a server includes the following operations.

In S701, the first device sends a custom probe request frame, the probe request frame carrying device information.

In the embodiment, the first device is in an STA mode after power-on and may broadcast the probe request frame.

In S702, the router sends the device information to the server.

In S703, the server receives a device information confirmation instruction from a user and sends verification success information to the router.

In S704, the router sends a probe response frame carrying encrypted information obtained by encrypting a hidden SSID and a first password to the first device based on the verification success information. In the embodiment, the hidden SSID in the probe response frame is a first network identifier.

In S705, the first device parses the probe response frame to obtain the encrypted information, decrypts the encrypted information with a pre-stored decryption key to obtain the hidden SSID and the first password, and establishes a first connection with the router based on the hidden SSID and the first password.

In S706, the router performs key negotiation with the first device based on the first connection.

In S707, the router encrypts a working SSID and a password and sends the encrypted working SSID and password to the first device.

In the embodiment, the working SSID is a second network identifier, and the password is a second password matched with the second network identifier.

In S708, the first device is connected to the working SSID and sends the device information to the server to complete binding.

It can be understood that, in the embodiment of the present disclosure, the first device carries the device information of the first device in the broadcast probe request frame, the router carries predetermined connection information in the probe response frame, the probe response frame carrying the predetermined connection information is sent after the device information is verified by the router, and a router that the first device is not required to be connected to may not transmit the probe response frame, so that the target router required to be connected may be selected from multiple routers for network configuration of the first device. In this process, the target router is determined before the first connection is established, so that network configuration accuracy may be improved. In addition, manual operations of the user are avoided, so that network configuration intelligence is improved. Moreover, the second network identifier for network configuration is directly sent to the first device by the router based on the first connection, and is not required to be obtained by receiving the broadcast from a cloud, so that the security in the network configuration process may be improved.

Figure 10:
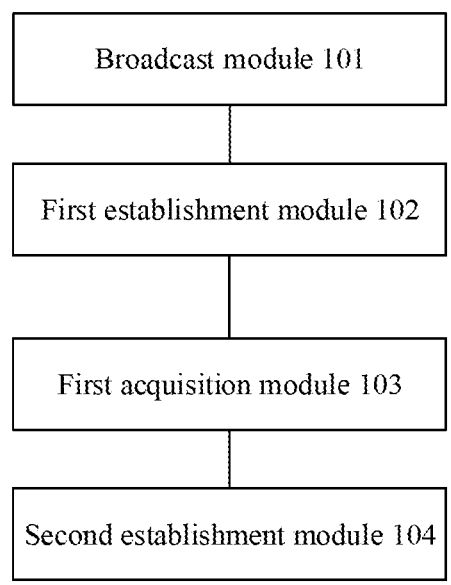
FIG. 10 is a first diagram of a device for network configuration according to an embodiment.

FIG. 10 is a first diagram of a device for network configuration according to an embodiment. The device for network configuration is applied to a first device. As illustrated in FIG. 10, the device for network configuration includes a broadcast module 101, a first establishment module 102, a first acquisition module 103, and a second establishment module 104.

The broadcast module 101 is configured to broadcast a probe request frame, the probe request frame carrying device information of the first device.

The first establishment module 102 is configured to, responsive to that a predetermined field of a received probe response frame carries predetermined connection information, establish, based on the predetermined connection information, a first connection with a target router that sent the probe response frame. The probe response frame carrying the predetermined connection information in the predetermined field is sent after the device information is verified.

The first acquisition module 103 is configured to acquire a second network identifier from the target router based on the first connection.

The second establishment module 104 is configured to establish a second connection with the target router based on the second network identifier, to perform interaction with a second device through the second connection.

Optionally, the probe request frame further carries a first network identifier pre-stored in the first device, and the predetermined connection information includes a MAC address of the target router.

The predetermined connection information can include the first network identifier and first password used to access the target router.

The device can further include a first key negotiation module 105, a second acquisition module 106, and a decryption module 107. The first key negotiation module 105 is configured to perform key negotiation with the target router based on the first connection to obtain a first key and a second key used with the first key in pair.

The second acquisition module 106 is configured to receive, based on the first connection, the second network identifier and second password encrypted by the target router according to the first key obtained by negotiation.

The decryption module 107 is configured to decrypt the encrypted second network identifier and second password with the first key or the second key corresponding to the first key obtained by negotiation.

Figure 11:
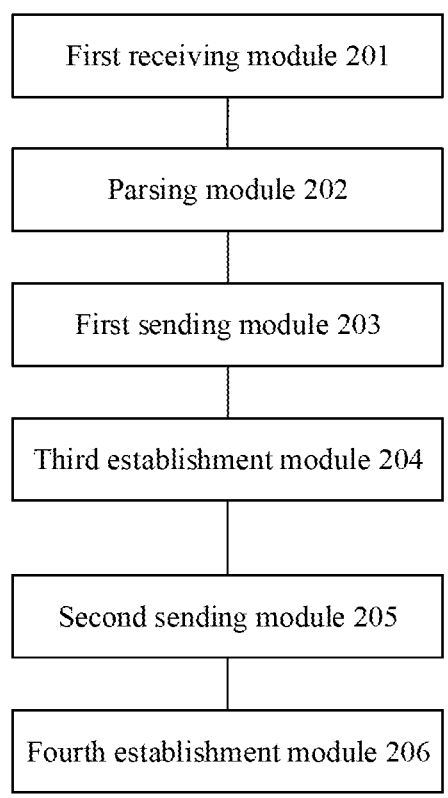
FIG. 11 is a second diagram of a device for network configuration according to an embodiment.

FIG. 11 is a second diagram of a device for network configuration according to an embodiment. The device for network configuration is applied to a router. As illustrated in FIG. 11, the device for network configuration includes a first receiving module 201, a parsing module 202, a first sending module 203, a third establishment module 204, a second sending module 205, and a fourth establishment module 206.

The first receiving module 201 is configured to receive a probe request frame broadcast by a first device. The probe request frame carries device information of the first device.

The parsing module 202 is configured to parse the probe request frame to obtain the device information, and send the device information to a server.

The first sending module 203 is configured to, responsive to receiving verification success information sent by the server based on the device information, send a probe response frame carrying predetermined connection information in a predetermined field to the first device.

The third establishment module 204 is configured to establish a first connection with the first device based on a first network identifier.

The second sending module 205 is configured to send a second network identifier to the first device based on the first connection.

The fourth establishment module 206 is configured to establish a second connection with the first device based on the second network identifier.

Optionally, the probe request frame further carries a first network identifier pre-stored in the first device, and the predetermined connection information includes a MAC address of the router.

Optionally, the predetermined connection information includes the first network identifier and a first password of the router.

The device can further include a second key negotiation module 207 and a third sending module 208. The second key negotiation module 207 can be configured to perform key negotiation with the first device based on the first connection to obtain a first key and a second key used with the first key in pair.

The third sending module 208 is configured to send the second network identifier and second password encrypted with the first key to the first device based on the first connection.

The fourth establishment module 206 is specifically configured to establish the second connection with the first device based on decrypted second network identifier and second password. Herein, the decrypted second network identifier and second password are obtained by the first device by decrypting the encrypted second network identifier and second password with the first key or the second key.

Figure 12:
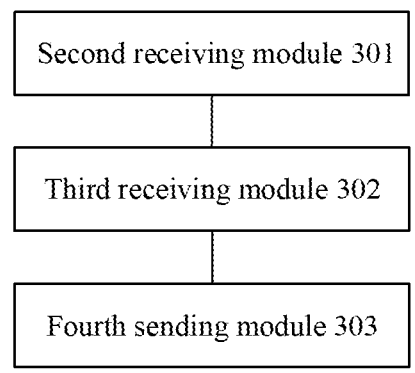
FIG. 12 is a third diagram of a device for network configuration according to an embodiment.

FIG. 12 is a third diagram of a device for network configuration according to an embodiment. The device for network configuration is applied to a server. As illustrated in FIG. 12, the device for network configuration includes a second receiving module 301, a third receiving module 302, and a fourth sending module 303.

The second receiving module 301 is configured to receive device information of a first device from a router and forward the device information to a third device. The device information is obtained by the router by parsing a received probe request frame broadcast by the first device.

The third receiving module 302 is configured to receive a device information confirmation instruction sent by the third device based on the device information.

The fourth sending module 303 is configured to send verification success information to the router according to the device information confirmation instruction, the verification success information being used to instruct the router to send a probe response frame carrying predetermined connection information in a predetermined field.

With respect to the device in the above embodiment, the specific manners for performing operations for individual modules therein have been described in detail in the embodiment regarding the method, which will not be elaborated herein.

Figure 13:
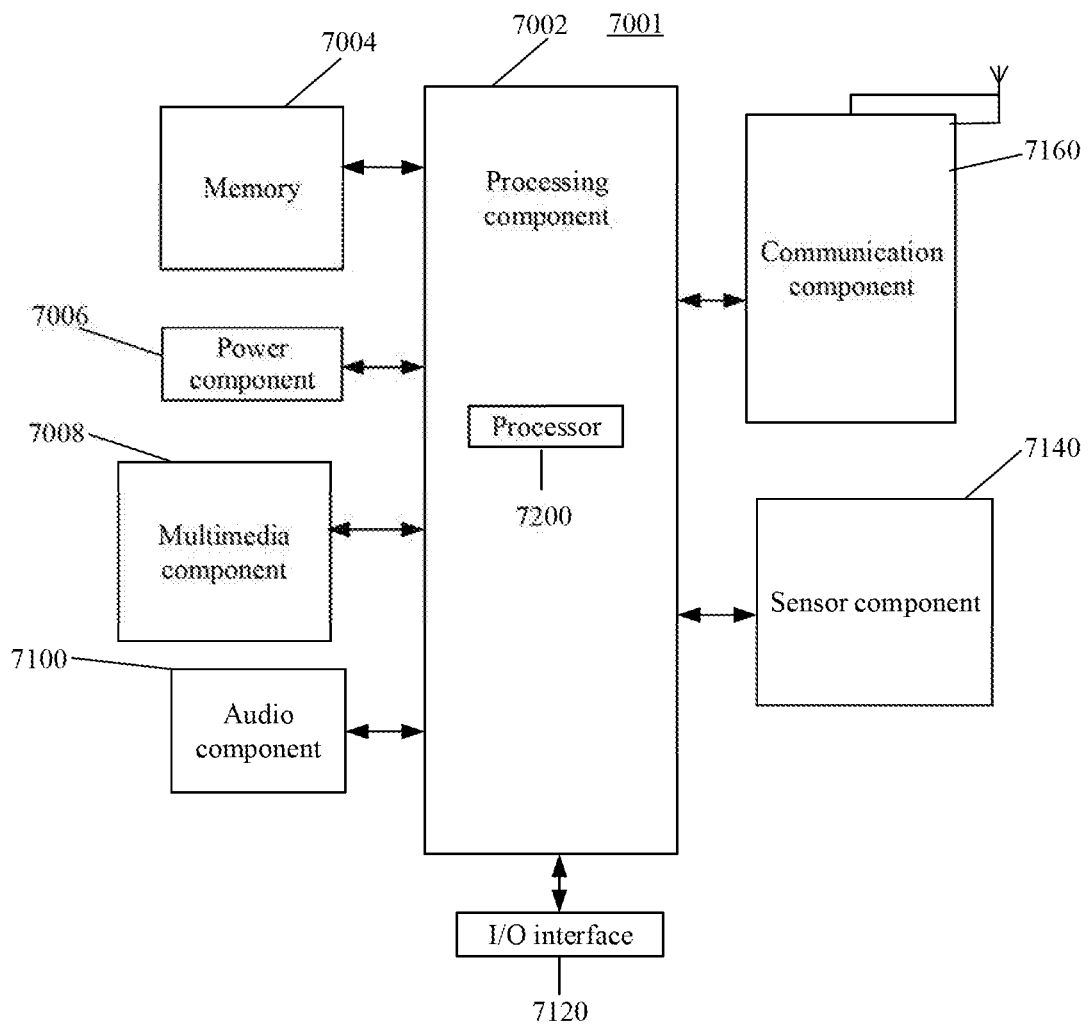
FIG. 13 is a block diagram of a first device according to an embodiment.

FIG. 13 is a block diagram of a first device according to an embodiment. For example, the first device 7000 may be an intelligent speaker.

Referring to FIG. 13, the first device 7000 may include one or more of the following components; a processing component 7002, a memory 7004, a power component 7006, a multimedia component 7008, an audio component 7100, an Input/Output (I/O) interface 7120, a sensor component 7140, and a communication component 7160.

The processing component 7002 typically controls overall operations of the device 7000, such as the operations associated with display, telephone calls, data communications, camera operations, and recording operations. The processing component 7002 may include one or more processors 7200 to execute instructions to perform all or part of the operations in the abovementioned method. Moreover, the processing component 7002 may include one or more modules which facilitate interaction between the processing component 7002 and the other components. For instance, the processing component 7002 may include a multimedia module to facilitate interaction between the multimedia component 7008 and the processing component 7002.

The memory 7004 is configured to store various types of data to support the operation of the device 7000. Examples of such data include instructions for any applications or methods operated on the device 7000, contact data, phonebook data, messages, pictures, video, etc. The memory 7004 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 7006 provides power for various components of the device 7000. The power component 7006 may include a power management system, one or more power supplies, and other components associated with generation, management and distribution of power for the device 7000.

The multimedia component 7008 includes a screen for providing an output interface between the device 7000 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 7008 includes a front camera and/or a rear camera. The front camera and/or the rear camera may receive external multimedia data when the device 7000 is in an operation mode, such as a photographing mode or a video mode. Each of the front camera and the rear camera may be a fixed optical lens system or have focusing and optical zooming capabilities.

The audio component 7100 is configured to output and/or input an audio signal. For example, the audio component 7100 includes a Microphone (MIC), and the MIC is configured to receive an external audio signal when the device 7000 is in the operation mode, such as a call mode, a recording mode and a voice recognition mode. The received audio signal may further be stored in the memory 7004 or sent through the communication component 7160. In some embodiments, the audio component 7100 further includes a speaker configured to output the audio signal.

The I/O interface 7120 provides an interface between the processing component 7002 and a peripheral interface module, and the peripheral interface module may be a keyboard, a click wheel, a button and the like. The button may include, but not limited to: a home button, a volume button, a starting button and a locking button.

The sensor component 7140 includes one or more sensors configured to provide status assessment in various aspects for the device 7000. For instance, the sensor component 7140 may detect an on/off status of the device 7000 and relative positioning of components, such as a display and small keyboard of the device 7000, and the sensor component 7140 may further detect a change in a position of the device 7000 or a component of the device 7000, presence or absence of contact between the user and the device 7000, orientation or acceleration/deceleration of the device 7000 and a change in temperature of the device 7000. The sensor component 7140 may include a proximity sensor configured to detect presence of an object nearby without any physical contact. The sensor component 7140 may also include a light sensor, such as a Complementary Metal Oxide Semiconductor (CMOS) or Charge Coupled Device (CCD) image sensor, configured for use in an imaging APP. In some embodiments, the sensor component 7140 may also include an acceleration sensor, a gyroscope sensor, a magnetic sensor, a pressure sensor or a temperature sensor.

The communication component 7160 is configured to facilitate wired or wireless communication between the device 7000 and another device. The device 7000 may access a communication-standard-based wireless network, such as a Wi-Fi network, a 2nd-Generation (2G) or 3rd-Generation (3G) network or a combination thereof. In an embodiment, the communication component 7160 receives a broadcast signal or broadcast associated information from an external broadcast management system through a broadcast channel. In an embodiment, the communication component 7160 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Bluetooth (BT) technology and another technology.

In an embodiment, the device 7000 may be implemented by one or more Application Specific Integrated Circuits (ASICs), Digital Signal Processors (DSPs). Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an embodiment, there is also provided a non-transitory computer-readable storage medium including instructions, such as the memory 7004 including instructions, and the instructions may be executed by the processor 7200 of the device 7000 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device, and the like.

According to a non-transitory computer-readable storage medium, instructions in the storage medium are executed by a processor of a first device to enable the first device to execute a method for network configuration. The method includes that a probe request frame is broadcast, the probe request frame carrying device information of the first device, and, responsive to that a predetermined field of a received probe response frame carries predetermined connection information, a first connection is established, based on the predetermined connection information, with a target router that sent the probe response frame, the probe response frame carrying the predetermined connection information in the predetermined field being sent after the device information is verified. Further, the method includes that a second network identifier is acquired from the target router based on the first connection, second connection with the target router is established based on the second network identifier, and interaction information between the first device and a second device is forwarded through the target router based on the second connection.

Figure 14:
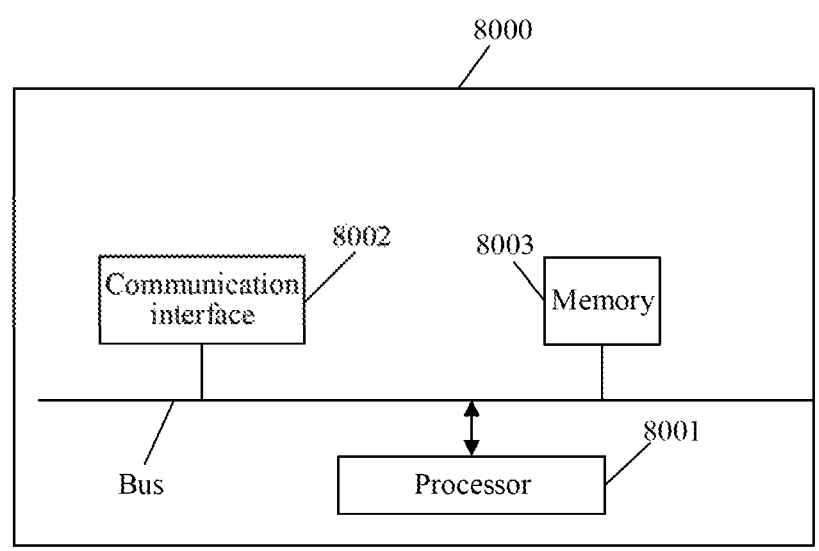
FIG. 14 is a block diagram of a router according to an embodiment.

FIG. 14 is a block diagram of a router according to an embodiment. Referring to FIG. 14, the router 8000 includes a processor 8001, a communication interface 8002 and a memory 8003.

The processor 8001 usually controls overall operations of the router.

The communication interface 8002 may enable the router to communicate with another terminal or server through a network.

The memory 8003 is configured to store instructions and APP executable by the processor 8001, may further cache data that is to be processed or has been processed by the processor 8001 and each module in the router, and may be implemented by a flash or a RAM.

According to a non-transitory computer-readable storage medium, instructions in the storage medium are executed by a processor of a router to enable the router to execute a method for network configuration. The method including that a probe request frame broadcast by a first device is received, the probe request frame carrying device information of the first device, the probe request frame is parsed to obtain the device information, and the obtained device information is sent to a server, and, responsive to receiving verification success information sent by the server based on the device information, a probe response frame carrying predetermined connection information in a predetermined field is sent to the first device. The method can further include that a first connection is established with the first device based on the predetermined connection information, a second network identifier is sent to the first device based on the first connection, and a second connection with the first device is established based on the second network identifier, to implement transmission of interaction information between the first device and a second device.

Figure 15:
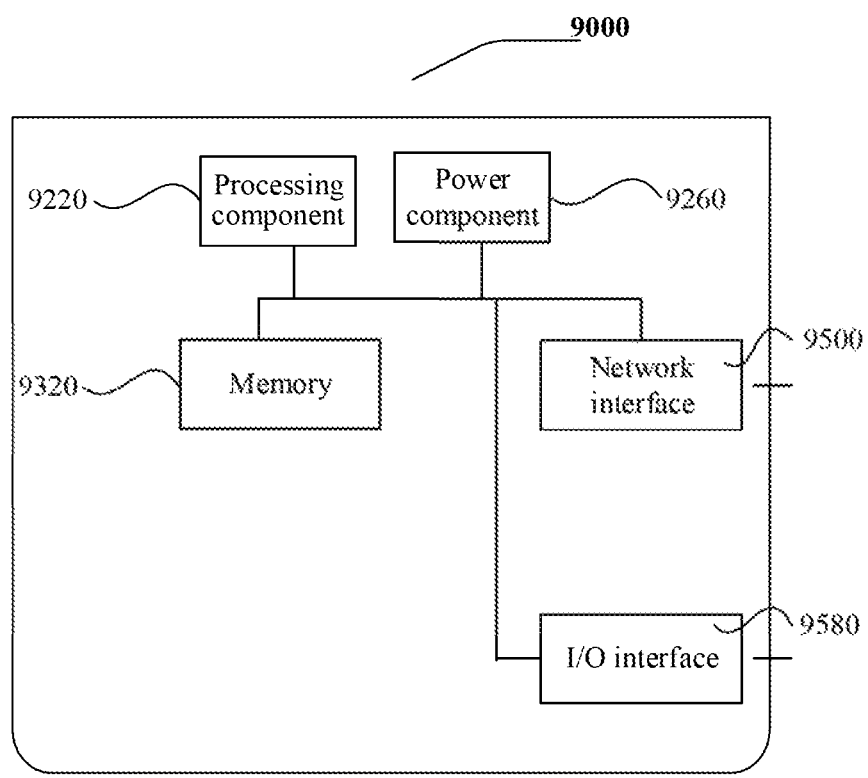
FIG. 15 is a block diagram of a server according to an embodiment.

FIG. 15 is a block diagram of a server according to an embodiment. Referring to FIG. 15, the server 9000 includes a processing component 9220 and a memory 9320. The processing component 9220 includes one or more processors. A memory resource represented by a memory 9320 is configured to store instructions executable by the processing component 9220, for example, an APP program. The APP program stored in the memory 9320 may include one or more than one module of which each corresponds to a set of instructions. In addition, the processing component 9220 is configured to execute the instructions to execute the abovementioned information processing method.

The device 9000 may further include a power component 9260 configured to execute power management of the device 9000, a wired or wireless network interface 9500 configured to connect the device 9000 to a network and an I/O interface 9580. The device 9000 may be operated based on an operating system stored in the memory 9320, for example, Windows Server™, Max OS X™, Unix™, Linux™, FreeBSD™, or the like.

In an embodiment, there is also provided a non-transitory computer-readable storage medium including instructions, such as the memory 9320 including instructions, and the instructions may be executed by the processing component 9220 of the device 9000 to implement the abovementioned method. For example, the non-transitory computer-readable storage medium may be a ROM, a RAM, a CD-ROM, a magnetic tape, a floppy disc, an optical data storage device, and the like.

According to a non-transitory computer-readable storage medium, instructions in the storage medium are executed by a processing component of a server to enable the server to execute an information processing method, the method including that device information of a first device is received from a router and forwarded to a third device, the device information being obtained by the router by parsing a received probe request frame broadcast by the first device. Further, the method including that a device information confirmation instruction sent by the third device according to the device information is received, and verification success information is sent to the router according to the device information confirmation instruction, the verification success information being used to instruct the router to send a probe response frame carrying predetermined connection information in a predetermined field.

Other implementation solutions of the present disclosure will be apparent to those skilled in the art from consideration of the specification and practice of the present disclosure. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for network configuration that is applied to a first device, the method comprising:

broadcasting a probe request frame, the probe request frame including device information of the first device;

establishing, based on predetermined connection information, a first connection with a target router that sent a probe response frame including the predetermined connection information in a predetermined field being sent after the device information is verified, when the predetermined field of the received probe response frame carries the predetermined connection information;

acquiring a second network identifier from the target router based on the first connection; and establishing a second connection with the target router based on the second network identifier in order to perform interaction with a second device through the second connection, wherein the method further comprises:

performing key negotiation with the target router based on the first connection to obtain a first key and a second key used with the first key in pair, wherein acquiring the second network identifier from the target router based on the first connection further includes receiving, based on the first connection, the second network identifier and a second password encrypted by the target router according to the first key obtained by negotiation, and wherein the method further comprises:

decrypting the encrypted second network identifier and second password with the first key or the second key.

2. The method of claim 1, wherein the probe request frame further includes a first network identifier pre-stored in the first device, and the predetermined connection information includes a Media Access Control (MAC) address of the target router.

3. The method of claim 1, wherein the predetermined connection information includes a first network identifier and a first password used to access the target router.

4. A non-transitory computer-readable storage medium having stored therein instructions that, when executed by a processor of an electronic device, cause the electronic device to perform the method for network configuration of claim 1.

5. A method for network configuration that is applied to a router, the method comprising:

receiving a probe request frame broadcast by a first device, the probe request frame including device information of the first device;

parsing the probe request frame to obtain the device information, and sending the device information to a server;

sending a probe response frame including predetermined connection information in a predetermined field to the first device when receiving verification success information sent by the server based on the device information;

establishing a first connection with the first device based on the predetermined connection information;

sending a second network identifier to the first device based on the first connection; and establishing a second connection with the first device based on the second network identifier in order to implement transmission of interaction information between the first device and a second device, wherein the method further comprises:
  performing key negotiation with the first device based on the first connection to obtain a first key and a second key used with the first key in pair,
  wherein sending the second network identifier to the first device based on the first connection comprises:
    sending the second network identifier and a second password encrypted with the first key to the first device based on the first connection; and
  wherein establishing the second connection with the first device based on the second network identifier comprises:
    establishing the second connection with the first device based on decrypted second network identifier and second password, the decrypted second network identifier and second password being obtained by the first device by decrypting the encrypted second network identifier and second password with the first key or the second key.

6. The method of claim 5, wherein the probe request frame further carries a first network identifier pre-stored in the first device, and the predetermined connection information comprises a Media Access Control (MAC) address of the router.

7. The method of claim 5, wherein the predetermined connection information includes a first network identifier and a first password of the router.

8. A router for implementing the method for network configuration of claim 5.

9. An electronic device, comprising:
  a processor; and
  a memory that is configured to store instructions executable by the processor,
  wherein the processor is configured to execute the instructions stored in the memory to:
    broadcast a probe request frame, the probe request frame including device information of the first device;
    establish, based on a predetermined connection information, a first connection with a target router that sent a probe response frame including predetermined connection information in the predetermined field that is sent after the device information is verified, when a predetermined field of a received probe response frame carries predetermined connection information;
    acquire a second network identifier from the target router based on the first connection; and
    establish a second connection with the target router based on the second network identifier in order to perform interaction with a second device through the second connection,
  wherein the processor is further configured to:
    perform key negotiation with the target router based on the first connection to obtain a first key and a second key used with the first key in pair;
    receive, based on the first connection, the second network identifier and a second password encrypted by the target router according to the first key; and
    decrypt the encrypted second network identifier and second password with the first key or the second key.

10. The device of claim 9, wherein the probe request frame further includes a first network identifier pre-stored in the first device, and the predetermined connection information includes a Media Access Control (MAC) address of the target router.

11. The device of claim 9, wherein the predetermined connection information includes a first network identifier and a first password used to access the target router.

* * * * *